(12) United States Patent
Bilger

(10) Patent No.: US 10,572,926 B1
(45) Date of Patent: Feb. 25, 2020

(54) USING ARTIFICIAL INTELLIGENCE TO EFFICIENTLY IDENTIFY SIGNIFICANT ITEMS IN A DATABASE

(71) Applicant: Amazon Technologies, Inc., Seattle, WA (US)

(72) Inventor: Jeffrey Matthew Bilger, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 677 days.

(21) Appl. No.: 15/133,345

(22) Filed: Apr. 20, 2016

Related U.S. Application Data

(63) Continuation of application No. 13/755,861, filed on Jan. 31, 2013, now abandoned.

(51) Int. Cl.
*G06Q 30/00* (2012.01)
*G06Q 30/06* (2012.01)
*G06N 5/02* (2006.01)

(52) U.S. Cl.
CPC ......... *G06Q 30/0625* (2013.01); *G06N 5/022* (2013.01); *G06Q 30/0603* (2013.01)

(58) Field of Classification Search
CPC ............... G06Q 30/00; G06Q 30/0601; G06Q 30/0603; G06Q 30/0623
See application file for complete search history.

(56) References Cited

U.S. PATENT DOCUMENTS

| 8,447,032 B1* | 5/2013 | Covell | G06F 16/9014 |
| | | | 380/28 |
| 2003/0145014 A1* | 7/2003 | Minch | G06F 16/35 |
| 2008/0010132 A1* | 1/2008 | Aaron | G06Q 30/02 |
| | | | 705/14.55 |
| 2009/0276437 A1* | 11/2009 | Weinstein | G06F 16/48 |
| 2010/0050211 A1* | 2/2010 | Seldin | H04N 5/44543 |
| | | | 725/46 |
| 2010/0274785 A1* | 10/2010 | Procopiuc | G06F 16/22 |
| | | | 707/737 |

(Continued)

OTHER PUBLICATIONS

Park, Yoon-Joo, and Alexander Tuzhilin. "The long tail of recommender systems and how to leverage it." Proceedings of the 2008 ACM conference on Recommender systems. ACM, 2008. (Year: 2008).*

(Continued)

*Primary Examiner* — Christopher B Seibert
(74) *Attorney, Agent, or Firm* — Lee & Hayes, P.C.

(57) ABSTRACT

Artificial intelligence is used to identify significant records in a computer database. The records in the database are ordered in accordance with a first factor. Records in the database which have a position less than a first threshold are identified to provide second-level records. At least some of the second-level records, but only the second-level records, are arranged into a plurality of groups based on a second factor. For at least one of the groups, the second-level records in the group are then ordered in accordance with a third factor. At least one second-level record in the group is selected, where the selected second-level record has a position greater than a second threshold. Information regarding the selected second-level record is then provided, such as to a client device.

20 Claims, 10 Drawing Sheets

(56) References Cited

U.S. PATENT DOCUMENTS

| | | | |
|---|---|---|---|
| 2011/0184806 A1* | 7/2011 | Chen | G06K 9/6226 |
| | | | 705/14.52 |
| 2012/0311139 A1* | 12/2012 | Brave | G06F 16/9535 |
| | | | 709/224 |
| 2013/0031108 A1* | 1/2013 | Trias | G06Q 10/04 |
| | | | 707/749 |
| 2013/0211950 A1* | 8/2013 | Nice | G06Q 30/0631 |
| | | | 705/26.7 |

OTHER PUBLICATIONS

Office action for U.S. Appl. No. 13/755,861, dated Jan. 21, 2016, Bilger, "Surfacing Products from a "Long Tail" of a Product Catalog", 15 pages.

Office action for U.S. Appl. No. 13/755,861, dated Aug. 3, 2015, Bilger, "Surfacing Products from a "Long Tail" of a Product Catalog", 11 pages.

\* cited by examiner

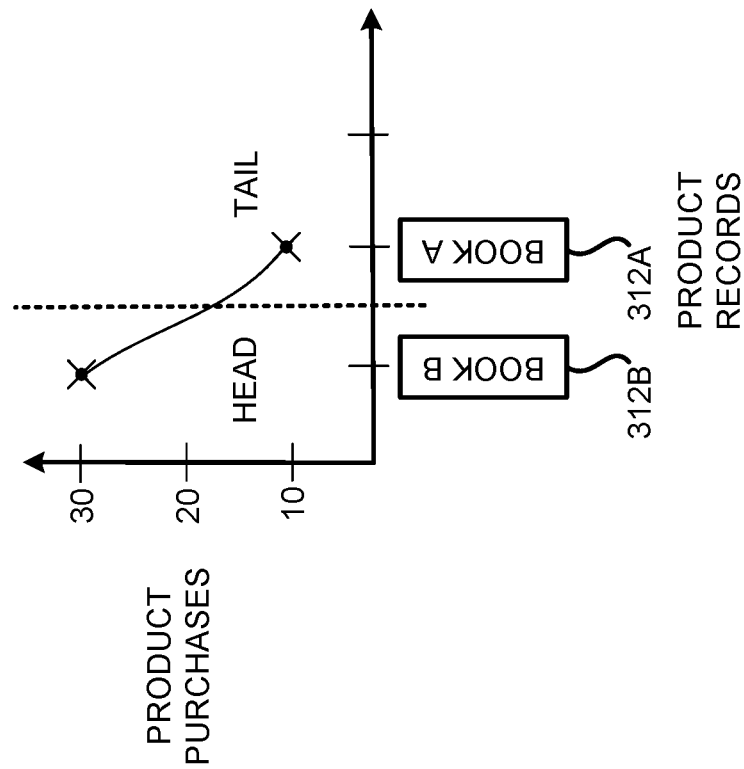
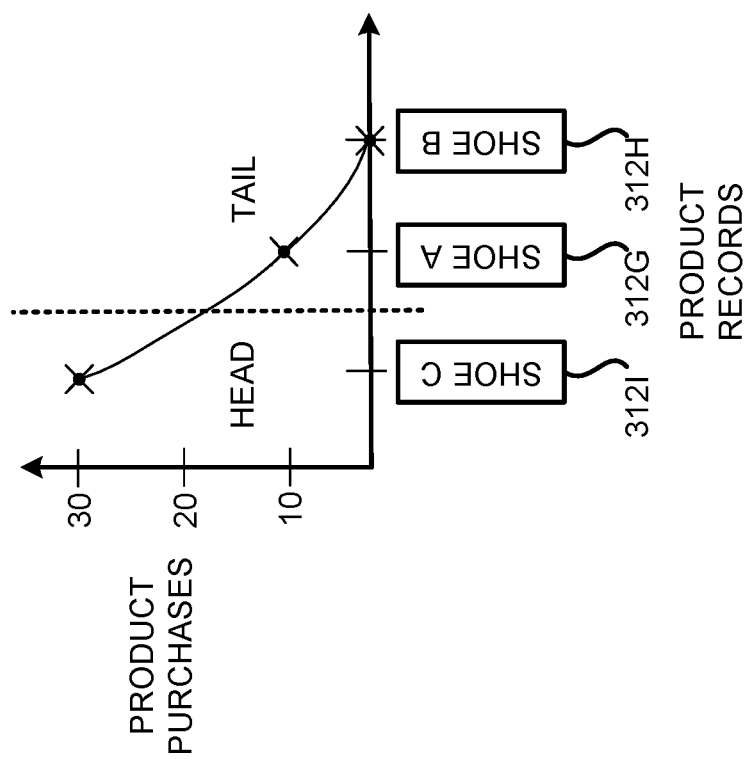

US 10,572,926 B1

USING ARTIFICIAL INTELLIGENCE TO EFFICIENTLY IDENTIFY SIGNIFICANT ITEMS IN A DATABASE

RELATED APPLICATIONS

This application is continuation of U.S. patent application Ser. No. 13/755,861 filed on Jan. 31, 2013, the entirety of which is incorporated herein by reference.

BACKGROUND

An online merchant may provide a large number of products for sale to customers over the Internet. Customers may access information regarding the available products through a World Wide Web ("Web") site, or other type of site, provided by the online merchant. Such a Web site may include Web pages with product information needed by a customer to identify and purchase a particular product, such as a description of the product, an image of the product, product specifications, the price and availability of the product, and a mechanism for initiating a purchase of the product.

In order to assist customers in locating desired products, the Web site or other information service provided by an online merchant will typically include a mechanism for searching available products. The Web site or other information service might also provide various mechanisms for allowing customers to discover other products that might be of interest. For example, some online merchants will display a list of "Zeitgeist" products to customers. Zeitgeist products are those products that are considered to be popular at a particular point in time. For instance, Zeitgeist products might include those products having the highest number of sales during a particular period of time. Zeitgeist products might also be limited to a particular category, such as the top selling products in music or movie categories of a product catalog.

Zeitgeist products are typically part of a "head" of a product catalog that includes popular items. In contrast, the remainder of a product catalog may be referred to as a "long tail" of the product catalog, which consists of niche or less well-known products. Because the products in the long tail of a product catalog are typically not exposed to customers, it can be difficult for customers to discover products contained in this portion of a product catalog.

It is with respect to these and other considerations that the disclosure made herein is presented.

BRIEF DESCRIPTION OF THE DRAWINGS

FIGS. 6A-6C are line graphs illustrating aspects of the heads and the long tails of the product records in the clusters shown in FIG. 5A;

DETAILED DESCRIPTION

Figure 1:
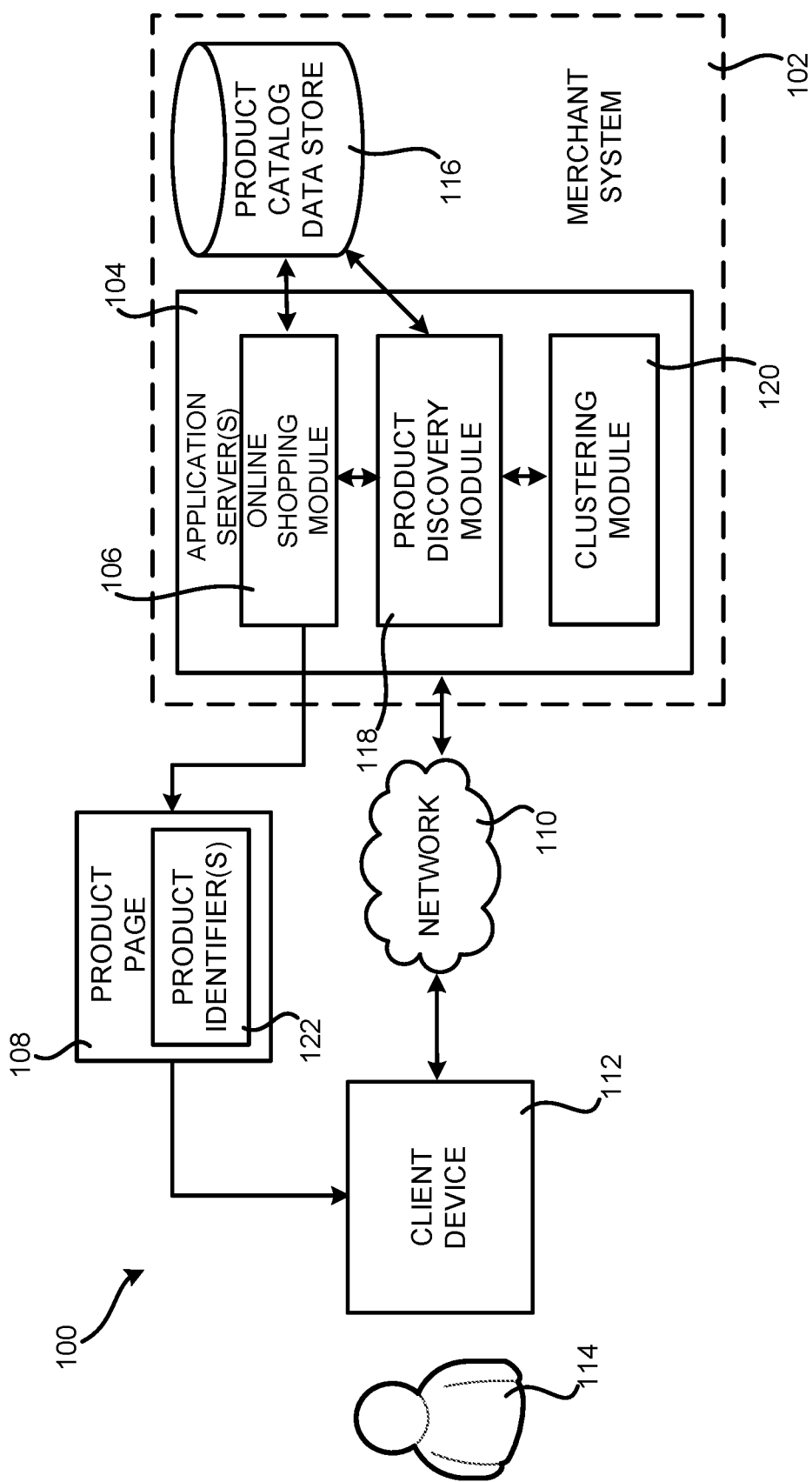
FIG. 1 is a system diagram showing an illustrative configuration for a merchant system that is configured to provide the functionality disclosed herein for surfacing products in the long tail of a product catalog, according to one embodiment disclosed herein.

The following detailed description is directed to technologies for surfacing products contained in the "long tail" of a product catalog. Through an implementation of the concepts and technologies disclosed herein, a merchant system can provide information to customers regarding products contained in the long tail (which may be referred to herein simply as the "tail") of a product catalog. Through the use of this functionality, customers may be able to discover products that they would not otherwise be able to discover through previous Zeitgeist-type product discovery mechanisms.

According to aspects presented herein, a merchant system is disclosed that is configured to execute an online shopping module that provides a Web site for online shopping. The online shopping module is also configured to maintain and utilize a product catalog data store (the "product catalog") that stores product records for products available for purchase through the Web site. The Web site provides functionality for browsing and searching for Web pages corresponding to products in the product catalog, for purchasing the products, and for performing other functions.

According to embodiments, the merchant system is also configured to provide functionality for exposing products from the tail of the product catalog. In order to enable this functionality, the merchant system is configured to execute a product discovery module in one embodiment disclosed herein. The product discovery module is a software component configured to surface products to customers from the tail of the product records in the product catalog. In this way, the online shopping module can assist customers of the Web site in discovering new products that they might not have otherwise discovered.

In order to identify products to be surfaced from the tail of the product catalog, the product discovery module identifies the product records in the "head" and in the tail of the product catalog. Product records in the head of the product catalog are those product records that correspond to products that are deemed to be popular. The popularity of a particular product might be evaluated using various metrics, such as the purchase volume of the products, as measured in units sold or money spent on the products, or purchase velocity, which refers to the number of products sold in a certain time period. Other measures might also be utilized to identify product records corresponding to popular products. For example, popularity might be measured by the number of page views for a product, the number of searches for a product, the rating of a product, the number of "likes" for a product, and/or other metrics or combination of metrics.

A limit might also be placed upon the number of product records that are included in the head of the product catalog. For example, the head of the product catalog might include only the top 5% or 10% most popular products in the product catalog. Products records not included in the head of the product catalog are considered to be a part of the tail of the product catalog. Products located in the tail of the product catalog are less popular (i.e. have a lower purchase volume or purchase velocity) than those products in the head of the product catalog.

Once the head and the tail of the product catalog have been identified, the product discovery module, or another module such as a clustering module, clusters the product records located in the tail of the product catalog. Clustering (which might also be referred to as "grouping" or "categorization") refers to a process of grouping together similar product records and separating dissimilar product records based upon attributes of the product records. For instance, clustering might be utilized to group product records based upon their product category, name, or description. As an example, different product records corresponding to toys might be included in the same cluster. Similarly, different product records corresponding to women's shoes might be included together in a cluster of product records.

According to embodiments disclosed herein, various types of algorithms might be utilized to cluster the product records in the tail of the product catalog. For example, in different embodiments, a k-Means algorithm, a k-nearest neighbor ("KNN") algorithm, a MinHash algorithm might be utilized to cluster the product records in the tail of the product catalog. In other embodiments, a latent factor clustering algorithm, such as latent semantic indexing ("LSI"), latent Dirichlet allocation ("LDA"), or probabilistic LSI ("PLSI"), might be utilized to cluster the product records. Latent factor clustering may provide more descriptive and targeted product clusters as compared to other types of clustering algorithms. For example, a cluster generated using latent factor clustering might be described as containing product records for "bargain outdoor shoes from well-respected brands." The clusters generated using latent factor clustering might also include products from multiple product categories.

Once the product records in the tail of the product catalog have been clustered in this manner, the product discovery module identifies the product records in the head and the tail of the product records in each cluster. The head and tail of each cluster may be identified in the manner described above. For example, the product discovery module might identify the products in the head and tail of each cluster based upon their popularity. Product records that are not in the head of a cluster are considered to be in the tail of the product records for the cluster.

Once the product records in the head and the tail of each cluster have been identified, the product discovery module surfaces product identifiers for products in the heads of the clusters. For example, the product discovery module might select one of the clusters based upon a product or product category currently being viewed by a customer, a product browsing history of the customer, or preferences specified by the customer. Products corresponding to product records in the in the head of the selected cluster may then be exposed to the customer. Other implicit and explicit behavioral signals provided by the customer might also be utilized to select a cluster of product records from which products are surfaced.

According to another embodiment, latent factor clustering might also be utilized to cluster the product records in an entire product catalog. As mentioned above, LSI, PLSI, LDA, or another type of latent factor clustering algorithm might be utilized to cluster the product records in the product catalog. Once the product records in the product catalog have been clustered in this manner, the product discovery module identifies the product records in the head and the tail of the product records in each cluster. The head and tail of each cluster may be identified in the manner described above.

Once the product records in the head and the tail of each cluster have been identified, the product discovery module may expose product identifiers from the products in the heads of the clusters. For example, and as described above, the product discovery module might select one of the clusters based upon a product or product category currently being accessed by a customer, a product browsing history of the customer, or preferences specified by the customer. Products corresponding to product records in the head of the selected cluster may then be exposed to the customer. Other implicit and explicit behavioral signals provided by the customer might also be utilized to select a cluster of product records from which to surface products. Additional details regarding these and other aspects of the embodiments disclosed herein will be provided below with regard to FIGS. 1-8.

It should be appreciated that the embodiments disclosed herein might be utilized with any type of computer, computing system, device, merchant site, application program, operating system, or other type of system or component. Accordingly, although the embodiments disclosed herein are primarily presented in the context of a merchant system that provides a Web site embodying the concepts disclosed herein for surfacing products from the long tail of a product catalog, the disclosure presented herein is not limited to such an implementation. For example, the concepts disclosed herein might be utilized in conjunction with an application store configured to sell applications executable on mobile devices, such as tablet computers and smartphones. The concepts disclosed herein might also be utilized with other types of electronic marketplaces, such as marketplaces for purchasing or renting digital media such as audio or video files.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like.

The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several hardware and software components for surfacing products from the long tail of a product catalog 116. As discussed above, the environment 100 is merely illustrative and the embodiments disclosed herein might be utilized in many different types of environments.

The environment 100 includes a merchant system 102 that is configured to provide the functionality disclosed herein. In order to provide this functionality, the merchant system 102 is configured with one or more application servers 104. The application servers 104 may execute a number of modules in order to provide the functionality disclosed herein. The modules may execute on a single application server 104 or in parallel across multiple application servers in the merchant system 102. In addition, each module may consist of a number of subcomponents executing on different application servers 104 or other computing devices in the merchant system 102. The modules may be implemented as software, hardware, or any combination of the two.

According to one embodiment, an online shopping module 106 executes on the application servers 104. The online shopping module 106 provides functionality for allowing customers of the merchant system 102, such as the customer 114, to browse, search, and purchase products available from the online merchant that operates the merchant system 102. For instance, the online shopping module 106 may retrieve information regarding a particular product offered for sale by the online merchant from a product catalog 116, generate a product page 108 containing product information, and transmit the product page 108 over a network 110 to a client application executing on a client device 112. Example client devices include tablet computing devices ("tablets"), electronic book readers ("e-readers"), and laptop or desktop computers ("computers"). Other types of client devices, such as smartphones, might also be utilized to access the functionality disclosed herein as being provided by the merchant system 102.

In order to generate the product page 108, the online shopping module 106 might utilize various pre-defined and stored resources, such as Web pages, images, text files, program code for generating Web pages, metadata, scripts, executable code, and other types of data utilized to create and/or provide a Web page. The online shopping module 106 might also generate Web pages and other resources dynamically at the time the product page 108 is requested using information stored in the product catalog 116. The product records in the product catalog might include various types of information for the products available for purchase or rental, including but not limited to, a unique product identifier, a product description, a product category, the number of units of the product in stock, and, potentially, other information.

The online shopping module 106 might also maintain a customer profile data store (not shown) that includes information about customers of the merchant system 102, such as their name, address and other contact information, payment information, page viewing history, preferences, and other data. As will be described in greater detail below, some of this information might be utilized to select a particular cluster of products from which products will be surfaced to the customer.

Users, such as the customer 114, utilizing client devices 112, like tablets, e-readers, and computers, may access the merchant system 102 through the network 110. The users may be individuals that desire to browse, search, purchase, or have purchased, one or more products from the merchant that operates the merchant system 102. As mentioned briefly above, the client devices that may be utilized to access the merchant system 102 may be tablets, e-readers, and computers, and any other type of computing device capable of connecting to the network 110 and communicating with the merchant system 102. The customer 114 might also be referred to herein as a "user" or a "visitor" to the Web site provided by the merchant system 102.

The network 110 may be a local-area network ("LAN"), a wide-area network ("WAN"), the Internet, or any other networking topology known in the art that connects client devices to the merchant system 102. As discussed briefly above, the merchant system 102 may include a number of application servers 104 that provide various online shopping services to the client devices over the network 110. Visitors may use a client application (not shown) executing on their respective client device 112 to access and utilize the online shopping services provided by the application servers 104.

In one embodiment the client application executing on the client devices is a Web browser application, such as the MOZILLA® FIREFOX® Web browser from MOZILLA FOUNDATION of Mountain View, Calif. The client application exchanges data with the application servers 104 in the merchant system 102 using the hypertext transfer protocol ("HTTP") or another appropriate protocol over the network 110. The client application might also be a stand-alone client application configured for communicating with the application servers 104. The client application might also utilize any number of communication methods known in the art to communicate with the merchant system 102 and/or the application servers 104 across the network 110, including remote procedure calls, SOAP-based Web services, remote file access, proprietary client-server architectures, and the like.

In one particular implementation, the application servers 106 are also configured to execute a product discovery module 118. As will be described in greater detail herein, the product discovery module 118 is configured to select one or more product identifiers 122 for presentation to a customer 114 in a product page 108 or another type of page. Through the presentation of the product identifiers 122, the product discovery module 118 can surface the identities of products that might be of interest to a customer 114. The product identifiers 122 might include a text and/or graphic description of a product, the price of the product, and potentially other information.

According to various embodiments, the products exposed to the customer 114 by way of the product identifiers 122 are products identified by product records in a tail of the product catalog 116. In order to identify the product records in the tail of the product records in the product catalog, the product discovery module 118 might first identify the product records in the head and the tail of the product catalog 116.

Once this has been completed, the product discovery module 118, or another module such as the clustering module 120, is configured to organize the product records in the tail of the product catalog 116 into clusters. Various algorithms might be utilized to generate the clusters of product records.

Once the product records in the head and the tail of each cluster have been identified, the product discovery module 118 selects product identifiers 122 for surfacing to the customer 114 from the products contained in the heads of the clusters. For example, the product discovery module 118 might select one of the clusters based upon a product or product category currently being accessed by a customer 114, a product browsing history of the customer 114, or preferences specified by the customer 114. Products corresponding to product records in the in the head of the selected cluster may then be exposed to the customer 114 by displaying the product identifiers 122 for the selected products. Other implicit and explicit behavioral signals provided by the customer 114 might also be utilized to select a cluster of product records from which products are selected for presentation to a customer 114. Additional details regarding the aspects disclosed herein for surfacing products from the long tail of a product catalog 116 will be provided below with regard to FIGS. 2-8.

Figure 2:
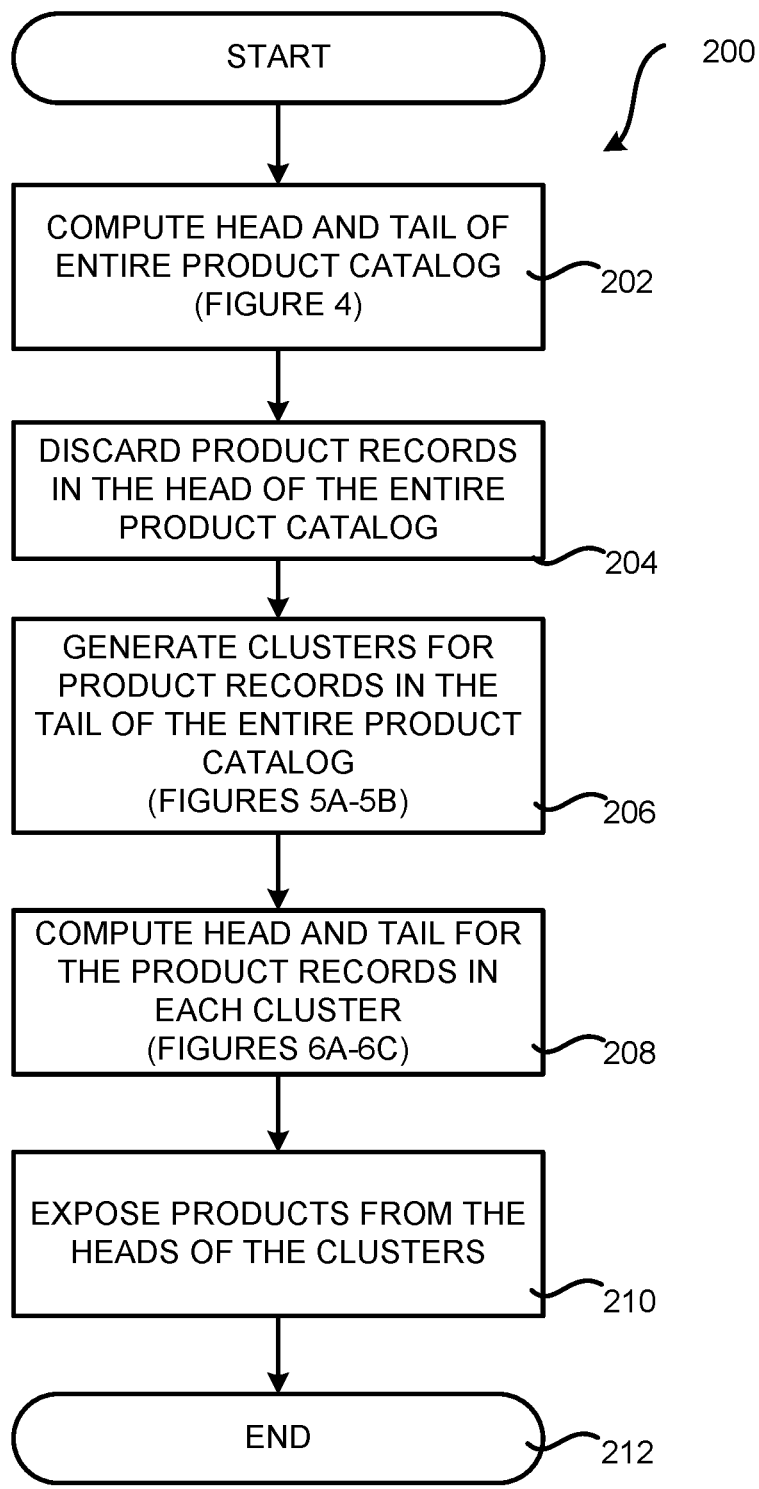
FIG. 2 is a flow diagram showing aspects of one illustrative routine for surfacing products from the long tail of a product catalog, according to one embodiment disclosed herein.

Turning now to FIG. 2, additional details will be provided regarding the embodiments described herein for surfacing products from the long tail of a product catalog. In particular, FIG. 2 is a flow diagram showing aspects of one illustrative routine 200 for surfacing products from the long tail of a product catalog 116, according to one embodiment disclosed herein. FIG. 2 will be described in conjunction with FIGS. 3-6C, which provide several examples by way of an illustrative product catalog (shown in FIG. 3).

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGS. are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 200 begins at operation 202, where the product discovery module 118 identifies the product records in the head and the tail of the product catalog 116. As discussed above, product records in the head of the product catalog 116 are those product records that correspond to products that are deemed to be popular. The popularity of a particular product might be evaluated using various metrics, such as the purchase volume of the product, as measured in units sold or money spent on the product, or purchase velocity, which refers to the number of products sold in a certain time period. Other measures might also be utilized to identify product records corresponding to popular products in the head of the product catalog 116. Other measures might also be utilized to identify product records corresponding to popular products. For example, popularity might be measured by the number of page views for a product, the number of searches for a product, the rating of a product, the number of "likes" for a product, and/or other metrics or combination of metrics.

Product records not included in the head of the product catalog 116 are considered to be a part of the tail of the product catalog 116. Products located in the tail of the product catalog 116 are less popular (i.e. have a lower purchase volume or purchase velocity) than those products in the head of the product catalog 116. Additional details regarding the identification of product records in a head and a tail of a product catalog may be found in "The Long Tail: Why the Future of Business is Selling Less of More" by Chris Anderson, Jul. 11, 2006.

As also discussed above, a limit might also be placed upon the number of product records that are included in the head of the product catalog 116. For example, the head of the product catalog might include only the top 5% or 10% most popular products in the product catalog 116. An operator of the merchant system 102 might specify the percentage or number of products that are to be included in the head of the product catalog 116.

Figure 3:
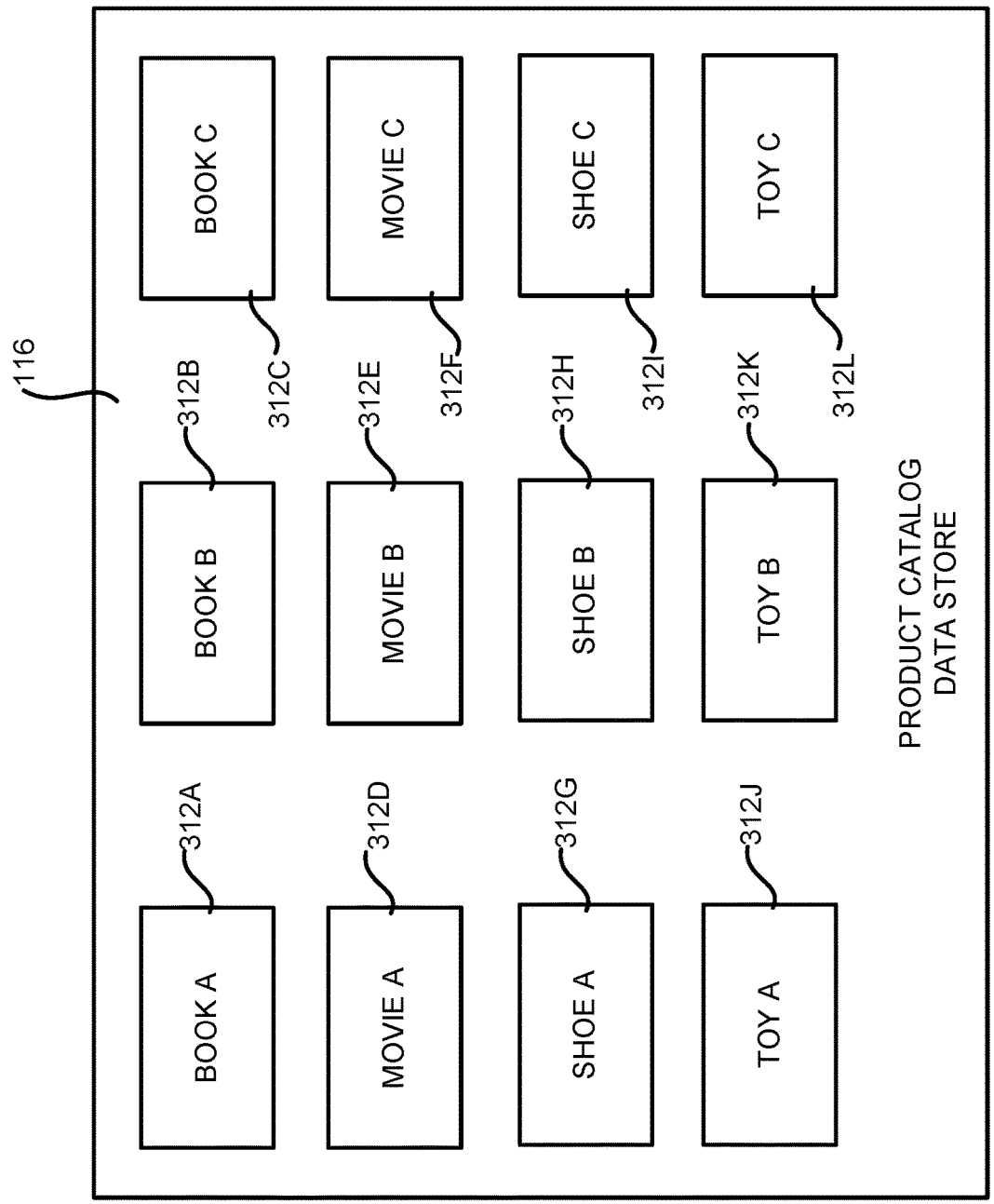
FIG. 3 is a data structure diagram showing an example product catalog that might be utilized by the various embodiments disclosed herein for surfacing products contained in the long tail of a product catalog.

FIG. 3 shows the contents of an illustrative product catalog 116. In this example, the product catalog 116 includes twelve product records 312A-312L. The product records 312A-312C correspond to books, such as physical or electronic books, the product records 312D-312F correspond to movies, such as DVD, BLURAY, or streaming movies, the product records 312G-312I correspond to shoes, and the product records 312J-312L correspond to toys. It should be appreciated that the example product catalog 116 shown in FIG. 3 has been simplified for discussion purposes, and that an actual product catalog 116 would likely include many more product records 312 for many other types of products. In some cases, a product catalog 116 might include millions or even tens of millions of product records 312.

Figure 4:
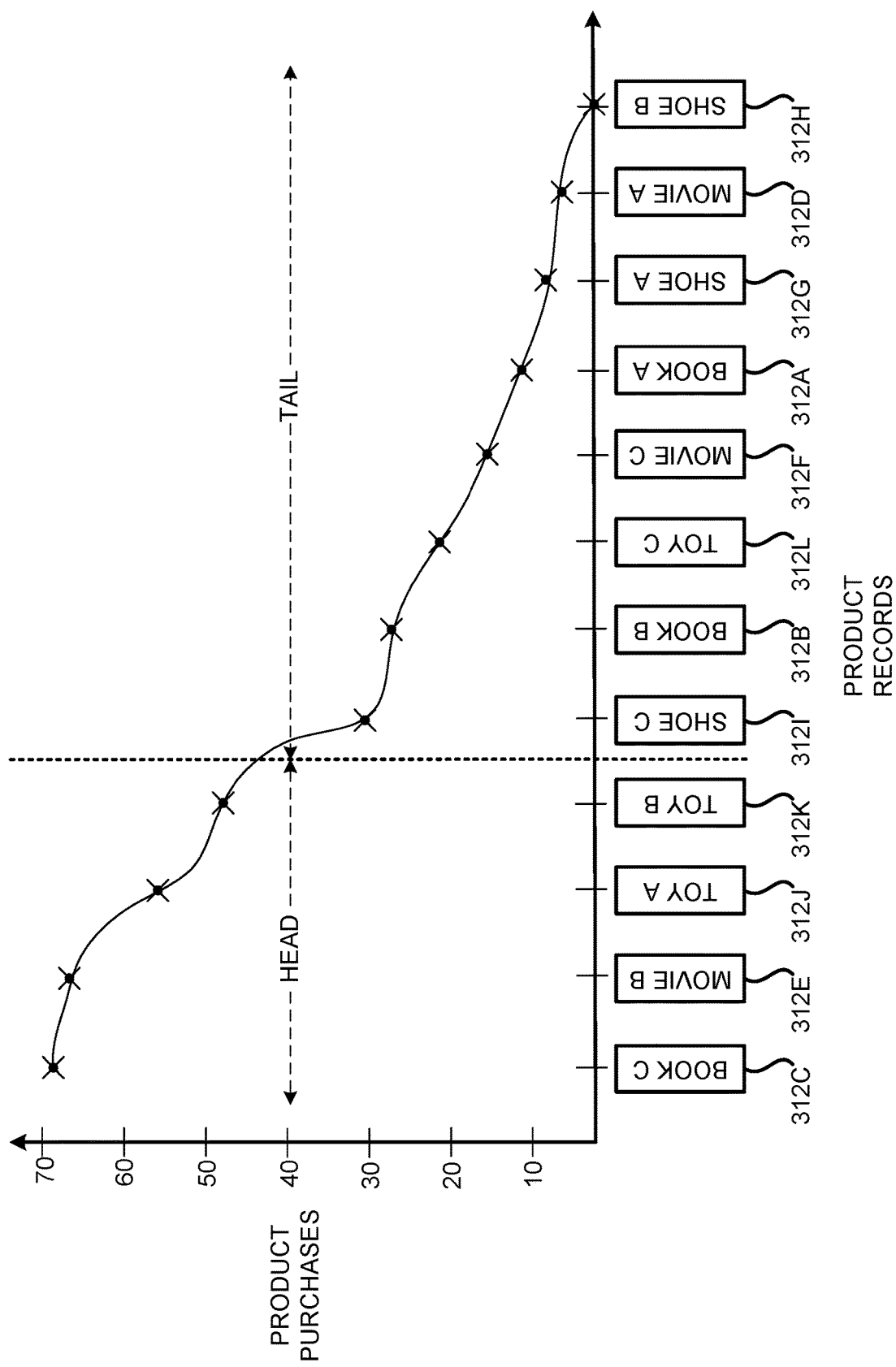
FIG. 4 is line graph illustrating aspects of the head and the long tail of the product records in the example product catalog shown in FIG. 3.

FIG. 4 shows a line graph illustrating aspects of the head and the long tail of the product records 312 in the example product catalog shown in FIG. 3. In this example, the Y-axis of the line graph corresponds to the number of purchases of the products referenced by the product records 312 in the product data store 116. In other scenarios, the Y-axis might refer to other measures of the popularity of the products, such as the total monetary amount of purchases of the products or the number of purchases of each of the products per time period.

The X-axis of the line graph shown in FIG. 4 includes the product records 312A-312L in the product catalog 116. The product records 312A-312L have been sorted from highest to lowest popularity, and the popularity measure has been plotted on the Y-axis. For example, the product identified by the product record 312C has been purchased approximately 70 times. The product identified by the product record 312K has been purchased approximately 50 times. The product corresponding to the product record 312D has been purchased only a few times, and the product identified by the product record 312H has not been purchased at all.

In the example shown in FIG. 4, the products corresponding to the product records 312C, 312E, 312J, and 312K have been identified as being in the head of the product catalog 116. The products corresponding to the product records 312I, 312B, 312L, 312F, 312A, 312G, 312D, and 312H have been identified as being in the tail of the product records 312 in the product catalog 116. As will be described in greater detail below, the embodiments disclosed herein surface products from the product records 312I, 312B, 312L, 312F, 312A, 312G, 312D, and 312H in the tail of the product catalog 116.

Once the head and the tail of the product records 312 in the product catalog 116 have been identified, the routine 200 proceeds from operation 202 to operation 204. At operation 204, the product discovery module 118 discards the product records 312C, 312E, 312J, and 312K. In this way, only the product records 312I, 312B, 312L, 312F, 312A, 312G, 312D, and 312H in the tail of the product catalog 116 are utilized for surfacing product information.

From operation 204, the routine 200 proceeds to operation 206, where the product discovery module 118, the clustering module 120, or another component, clusters the product records 312 located in the tail of the product catalog 116. In the example shown in FIG. 4, for instance, the product records 312I, 312B, 312L, 312F, 312A, 312G, 312D, and 312H have been clustered. As described briefly above, clustering refers to a process of grouping together similar product records 312 and separating dissimilar product records 312. For instance, clustering might be utilized to group product records 312 based upon their product category, description, name, or other attributes. As an example, different product records 312 corresponding to toys might be included in the same cluster. Similarly, different product records 312 corresponding to men's shoes might be included together in the same cluster of product records 312.

Figure 5A:
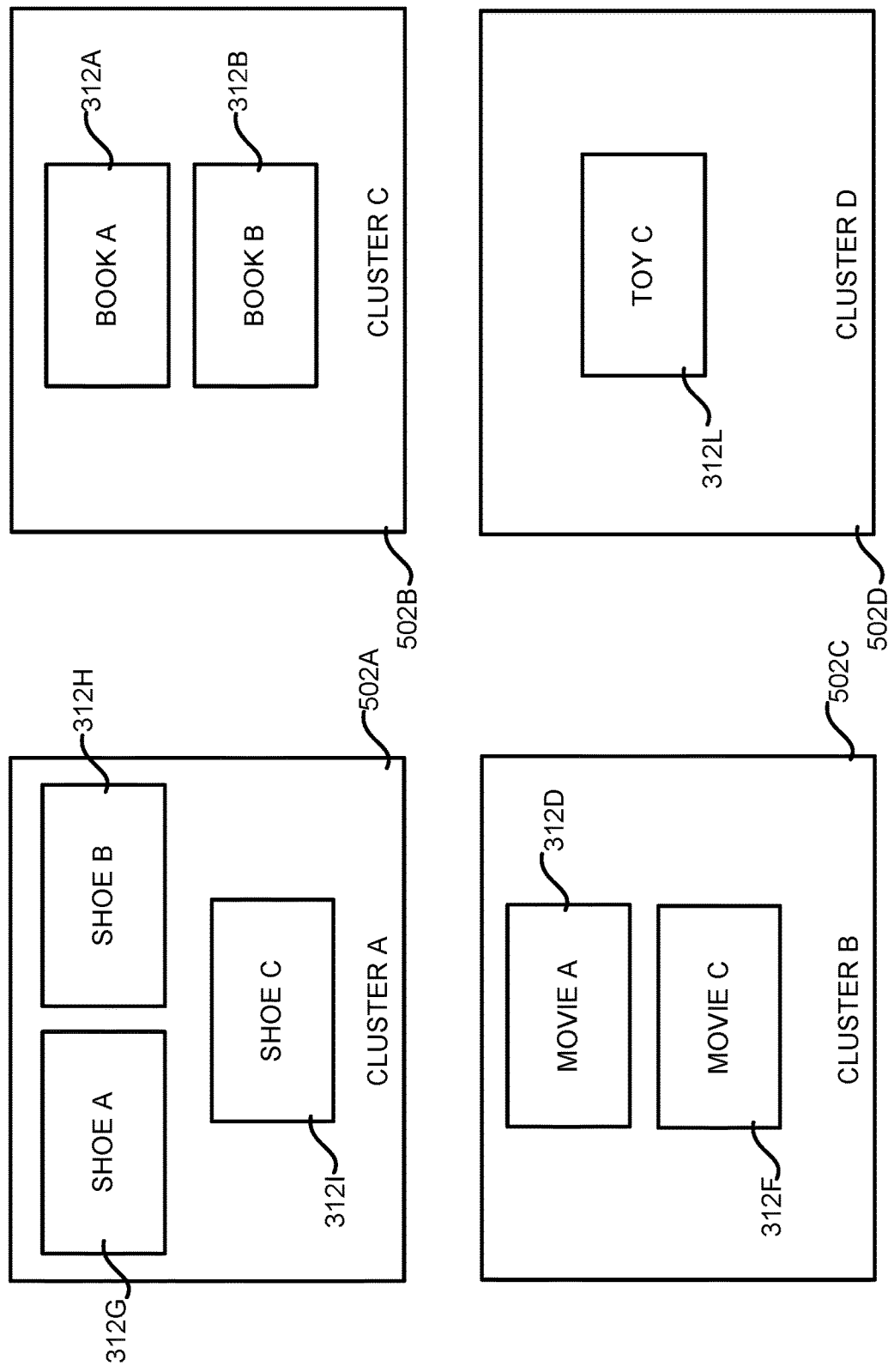
FIGS. 5A and 5B are data structure diagrams showing several illustrative clusters of products records in the long tail of product records in the example product catalog shown in FIG. 3.
Figure 5B:
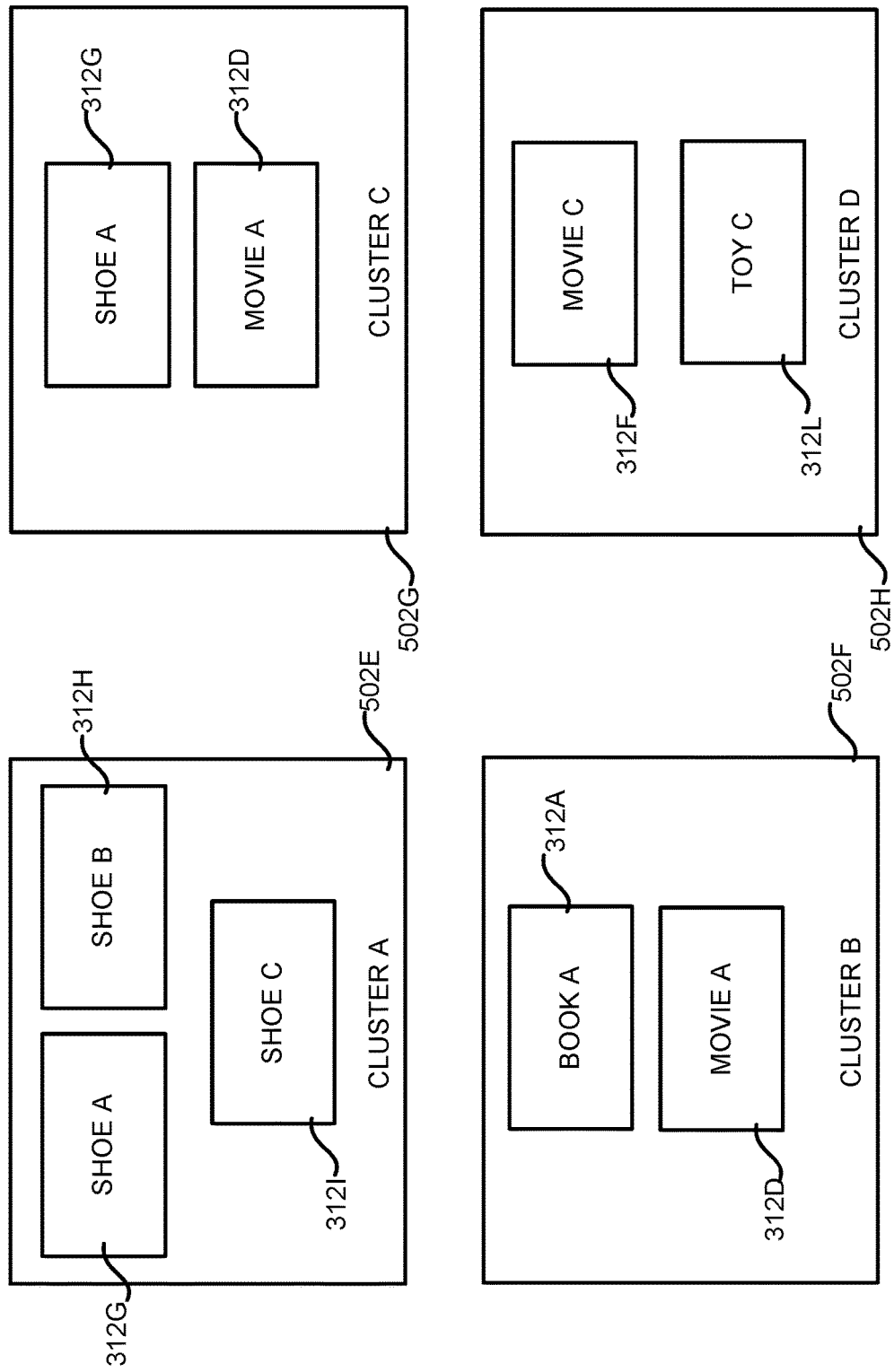

According to various embodiments, different types of algorithms might be utilized to cluster the product records 312 in the tail of the product catalog 116. For example, in different embodiments, a k-Means algorithm, a KNN algorithm, or a MinHash algorithm might be utilized to cluster the product records 312 in the tail of the product catalog. FIG. 5A shows clusters 502A-502D for the product records 312I, 312B, 312L, 312F, 312A, 312G, 312D, and 312H in the tail of the product catalog 116 that have been clustered using one of these mechanisms. Other types of algorithms and/or combinations of algorithms might also be utilized.

In the example shown in FIG. 5A, the cluster 502A includes the product records 312G, 312H, and 312I, that correspond to shoes. In this example, the cluster 502B includes the product records 312A and 312B, which correspond to books. The cluster 502C includes the product records 312D and 312F, which correspond to movies. The cluster 502D includes a single product record 312L, corresponding to a toy product. It should be appreciated that each of the clusters 502 may have many more product records 312 contained therein when a product database 116 is utilized having a greater number of product records 312.

In some implementations, a latent factor clustering algorithm, such as LSI, PLSI, or LDA is utilized to cluster the product records 312 in the product catalog 116. As known to those skilled in the art, latent factor clustering is a process for uncovering latent, or hidden, properties from explicit properties. Latent factor clustering may provide more descriptive and targeted product clusters 502 as compared to the other types of clustering algorithms described above. The clusters 502 generated using latent factor clustering might also include products from multiple product categories.

FIG. 5A shows clusters 502E-502H for the product records 312I, 312B, 312L, 312F, 312A, 312G, 312D, and 312H in the tail of the product catalog 116 that have been clustered using latent factor clustering. In this example, the cluster 502E includes the product records 312G, 312H, and 312I, all of which correspond to shoes. The cluster 502F, however, includes a product record 312A corresponding to a book and a product record 312D corresponding to a movie.

The cluster 502G also includes products from multiple categories. In particular, this cluster includes a product record 312G corresponding to a shoe and a product record 312D corresponding to a movie. The cluster 502H also includes a product record 312F corresponding to a movie and a product record 312L corresponding to a toy. Thus, it should be appreciated that the clusters 502E-502H created by a latent factor clustering algorithm may include product records 312 from multiple categories. Additionally, the product records 312 might appear in multiple clusters 502 when latent factor clustering is utilized.

Once the product records 312I, 312B, 312L, 312F, 312A, 312G, 312D, and 312H in the tail of the product catalog 312 have been clustered utilizing one of the mechanisms described above, the routine 200 proceeds from operation 206 to operation 208. At operation 208, the product discovery module 118 identifies the product records 312 in the head and the tail of the product records 312 in each cluster 502. The head and tail of each cluster 502 might be identified in the manner described above with respect to operation 202. For example, the product discovery module 118 might identify the product records 312 in the head and tail of each cluster 502 based upon their popularity. Product records 312 that are not in the head of a cluster 502 are considered to be in the tail of the product records for the cluster 502.

Figure 6C:
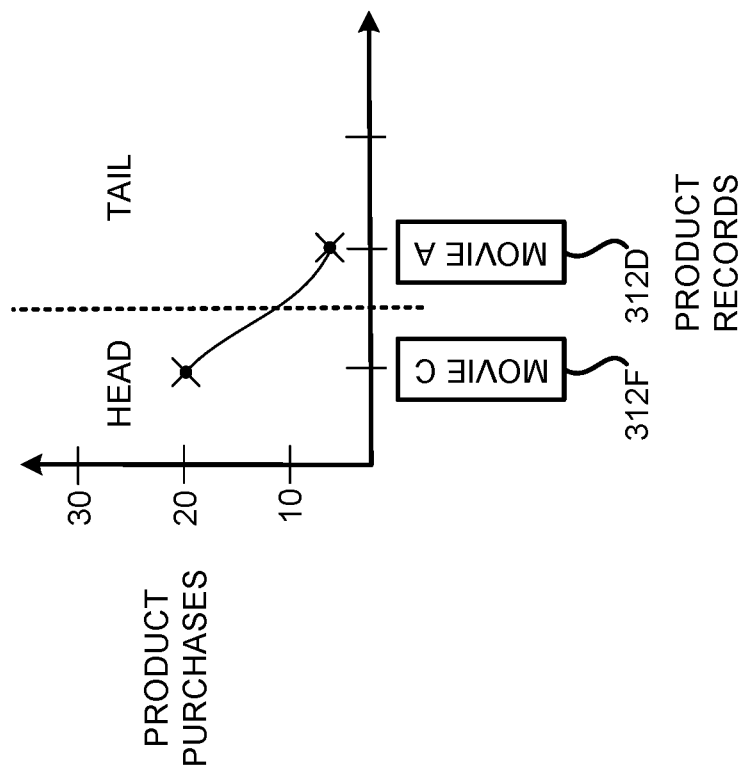

FIGS. 6A-6C are line graphs illustrating aspects of the heads and the long tails of the product records 312 in the clusters 502A-502C shown in FIG. 5A. In particular, FIG. 6A shows a line graph corresponding to the product records 312I, 312G, and 312H in the cluster 502A. In this example, the product identified by the product record 312I has been purchased approximately 30 times, the product identified by the product record 312G has been purchased approximately 10 times, and the produce identified by the product record 312H has not been purchased at all. Consequently, in this example, the product record 312I is considered to be in the head of the product records 312 in the cluster 502A and the product records 312G and 312H are considered to be in the tail of the product records 312 in the cluster 502A.

FIG. 6B shows a line graph corresponding to the product records 312A and 312B in the cluster 502B. In this example, the product identified by the product record 312B has been purchased approximately 30 times and the product identified by the product record 312A has been purchased approximately 10 times. Consequently, in this example, the product record 312B is considered to be in the head of the product records 312 in the cluster 502B and the product record 312A is considered to be in the tail of the product records 312 in the cluster 502B.

FIG. 6C shows a line graph corresponding to the product records 312F and 312D in the cluster 502C. In this example, the product identified by the product record 312F has been purchased approximately 20 times and the product identified by the product record 312D has been purchased approximately 5 times. Consequently, in this example, the product record 312F is considered to be in the head of the product records 312 in the cluster 502C and the product records 312D is considered to be in the tail of the product records 312 in the cluster 502B. A line graph is not shown for the cluster 502D since this cluster has only one record 312L in the example shown in FIG. 5A.

Once the product records 312 in the head and the tail of each cluster 502 have been identified, the routine 200 proceeds from operation 208 to operation 210. At operation 210, the product discovery module 118 generates surfaces products from the product records 312 in the heads of the clusters 502. For example, the product discovery module 118 might select one of the clusters 502A-502C based upon a product or product category currently being accessed by a customer 114. The product discovery module might also select one of the clusters 502A-502C based upon a product browsing history of the customer 114 or preferences specified by the customer 144. Other implicit and explicit behavioral signals provided by the customer might also be utilized to select a cluster 502 of product records 312 from which products are to be surfaced to a customer 114. For example, the current geographic location of a customer might be utilized to select a cluster 502 of product records 312 from which products are to be surfaced to the customer 114.

Once the product discovery module 118 has selected one of the clusters 502A-502C, the product discovery module 118 surfaces products from the product records 312 in the head of the selected cluster 502. For example, if the cluster 502A is selected, the product discovery module 118 might surface product information for the product corresponding to the product record 312I. If the cluster 502B is selected, the product discovery module 118 might expose product information for the product corresponding to the product record 312B. Similarly, if the cluster 502C is selected, the product discovery module 118 might surface product information for the product corresponding to the product record 312F.

In some embodiments, the product discovery module 118 surfaces information for multiple products using the product records 312 in the heads of the clusters 502. For example, the product discovery module 118 might cause a list to be presented to a customer 114 that includes the top N most popular products in the head of a particular cluster 312. The products referenced by product records 312 in the head of the clusters 502 might also be exposed in other ways. Once the product, or products, have been surfaced to the customer 114, the routine the routine 200 proceeds to operation 212, where it ends.

It should be appreciated that the process described above with regard to FIG. 2 may be repeated to provide surface product information to multiple customers 114 of the merchant system 102 simultaneously. It should also be appreciated that operations 202, 204, 206, and 208 may be performed periodically, and the results of these operations stored for later use in exposing products to customers 114.

Figure 7:
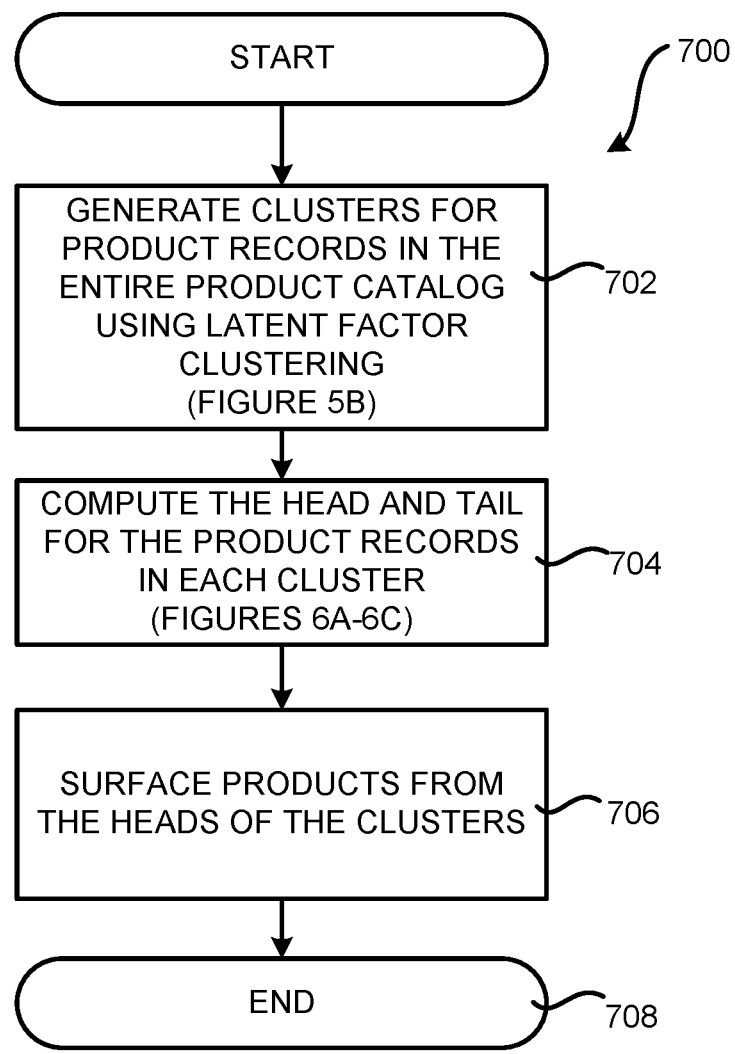
FIG. 7 is a flow diagram showing aspects of one illustrative routine for surfacing products from a product catalog by clustering the product records in the product catalog using latent factor clustering, according to one embodiment disclosed herein.

FIG. 7 is a flow diagram showing aspects of one illustrative routine 700 for surfacing products from a product catalog 116 by clustering the product records 312 in the product catalog 116 using latent factor clustering, according to one embodiment disclosed herein. The routine 700 begins at operation 702, where clusters 502 are generated for product records 312 in the product catalog 116 using latent factor clustering. For example, the clustering module 120 might utilize LSI, PLSI, LDA, or another type of latent factor clustering algorithm to cluster the product records 312 in the product catalog 116.

Once the product records 312 in the product catalog 116 have been clustered in this manner, the routine 700 proceeds from operation 702 to operation 704. At operation 704, the product discovery module 118 identifies the product records 312 in the head and the tail of the product records 312 in each cluster 502. The product records 312 in the head and tail of each cluster 502 may be identified in the manner described above with respect to operation 208.

Once the product records in the head and the tail of each cluster 502 have been identified at operation 704, the routine 700 proceeds to operation 706. At operation 706, the product discovery module 118 surfaces information for products corresponding to product records 312 in the heads of the clusters 502. For example, and as described above, the product discovery module 118 might select one of the clusters 502 based upon a product or product category currently being accessed by a customer 114, a product browsing history of the customer 114, preferences specified by the customer 114, or other implicit or explicit behavioral signals provided by the customer 114. The product discovery module 118 may then surface product information for products identified by product records 312 in the head of the selected cluster 502. From operation 706, the routine 700 proceeds from operation 706 to operation 708, where it ends.

Figure 8:
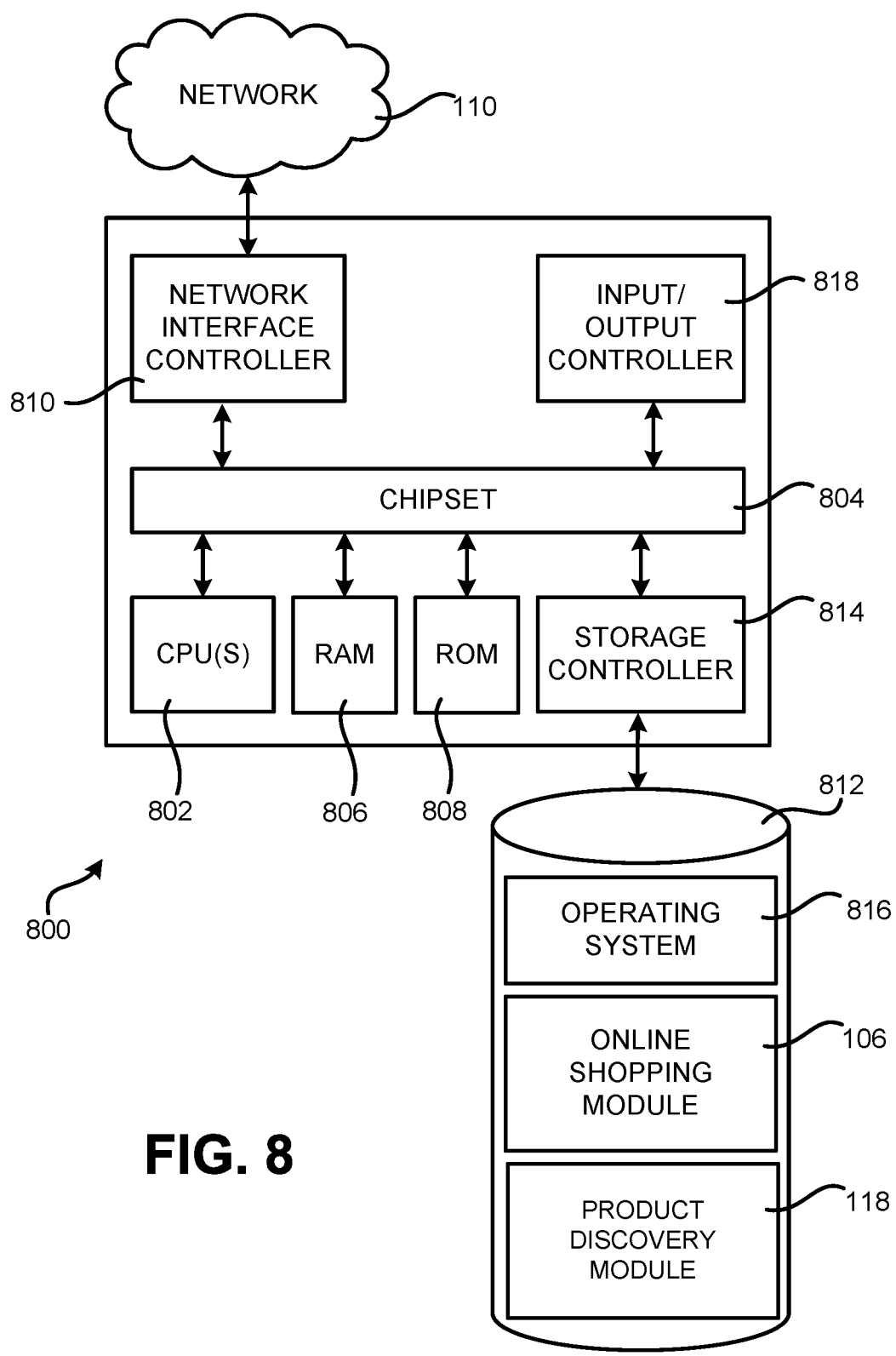
FIG. 8 is a computer architecture diagram showing one illustrative computer hardware architecture for use in computing devices configured to implement the concepts and technologies disclosed herein in one embodiment.

FIG. 8 shows an example computer architecture for a computer 800 capable of executing the software components described herein for surfacing products from the long tail of a product catalog 116 in the manner presented above. The computer architecture shown in FIG. 8 illustrates a conventional server computer, workstation, desktop computer, laptop, electronic book reader, digital wireless phone, tablet computer, network appliance, set-top box, or other computing device. The computer architecture shown in FIG. 8 may be utilized to execute any aspects of the software components presented herein described as executing on the application servers 104, the client device 112, or any other computing platform.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 are standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 804 provides an interface between the CPUs 802 and the remainder of the components and devices on the baseboard. The chipset 804 may provide an interface to a random access memory ("RAM") 806, used as the main memory in the computer 800. The chipset 804 may further provide an interface to a computer-readable storage medium such as a read-only memory ("ROM") 808 or non-volatile RAM ("NVRAM") for storing basic routines that that help to startup the computer 800 and to transfer information between the various components and devices. The ROM 808 or NVRAM may also store other software components necessary for the operation of the computer 800 in accordance with the embodiments described herein.

According to various embodiments, the computer 800 may operate in a networked environment using logical connections to remote computing devices and computer systems through a network, such as a local-area network ("LAN"), a wide-area network ("WAN"), the Internet, or any other networking topology known in the art that connects the computer 800 to remote computers. The chipset 804 includes functionality for providing network connectivity through a network interface controller ("NIC") 810, such as a gigabit Ethernet adapter.

For example, the NIC 810 may be capable of connecting the computer 800 to other computing devices, such as the application servers 104, a data storage system in the merchant system 102, and the like, over the network 110 described above in regard to FIG. 1. It should be appreciated that multiple NICs 810 may be present in the computer 800, connecting the computer to other types of networks and remote computer systems.

The computer 800 may be connected to a mass storage device 812 that provides non-volatile storage for the computer. The mass storage device 812 may store system programs, application programs, other program modules, and data, which have been described in greater detail herein. The mass storage device 812 may be connected to the computer 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 800 may store data on the mass storage device 812 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage, or the like.

For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 might have access to other computer-readable media to store and retrieve information, such as program modules, data structures, or other data. It should be appreciated by those skilled in the art that computer-readable media can be any available media that may be accessed by the computer 800, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 812 may store an operating system 816 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 812 may store other system or application programs and data utilized by the computer 800. For instance, when utilized to implement the client device 112, the mass storage device may store a client application, such as a Web browser application. When utilized to implement one or more of the application servers 104, the mass storage device may store the online shopping module 106, the product discovery module 118, and/or the product catalog 116.

In one embodiment, the mass storage device 812 or other computer-readable storage media may be encoded with computer-executable instructions that, when loaded into the computer 800, transform the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 has access to computer-readable storage media storing computer-executable instructions that, when executed by the computer, perform the various routines and operations described herein.

The computer 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display device, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for surfacing products from the long tail of a product catalog have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of artificial intelligence to efficiently identify significant records in a database, the computer-implemented method comprising executing instructions in a computer system to:
   order a plurality of records in a database in accordance with a first factor, wherein the records in the database correspond to products in a catalog;
   identify records in the database which have a first position to provide first-level records and records in the database which have a second position to provide second-level records, the first position being greater than a first threshold, the second position being less than the first threshold, such that first-level records do not include the second-level records;
   group at least some of the second-level records into a plurality of groups, the plurality of groups being based on a second factor, such that the plurality of groups do not include the first-level records;
   for at least some groups of the plurality of groups, order the second-level records in the at least some groups in accordance with one or more of a third factor and the first factor;
   for each group of the at least some groups, identify records in the group which have a third position, the third position being greater than a second threshold for the group;
   store the plurality of groups, including identification of records which have the third position;
   if a record in the database is being browsed then to:
      determine if the record being browsed has the first position;
   if the record being browsed has the first position then to:
      determine which group the record being browsed is in to identify a browse group;
      select at least one record in the browse group which has the third position to provide a significant record; and
      provide information regarding the significant record by presenting information related to a particular product in the catalog corresponding to the significant record to a user through a graphical user interface of an electronic marketplace web site;
   wherein efficiency is obtained in providing information regarding the significant record by, prior to the browsing, performing at least the above operations to: order the records in accordance with the first factor, identify the first-level records and the second-level records, order the second-level records in accordance with the one or more of the third factor and the first factor, and identify records which have the third position.

2. The computer-implemented method of claim 1 and further comprising to:
   select an additional record in the browse group having the third position to provide an additional significant record; and
   provide information regarding the additional significant record.

3. The computer-implemented method of claim 1 wherein:
   the first factor is popularity of the products based on a respective number of page views of the products.

4. The computer-implemented method of claim 1 wherein:
   the first factor is popularity of the products based upon a purchase volume of the products.

5. The computer-implemented method of claim 1 wherein:
   the first factor is popularity of the products based upon a purchase velocity of the products.

6. The computer-implemented method of claim 1, wherein to identify records in the database which have the second position less than to provide second-level records comprises to:
   identify records which have the first position to provide initial first-position records;
   limit a number of the initial first-position records to provide final first-position records; and
   include the initial first-position records which are not in the final first-position records as second-level records.

7. The computer-implemented method of claim 1, wherein to identify records in the database which have the second position to provide second-level records comprises to:
   identify records which have the first position to provide initial first-position records;
   place a limit on the initial first-position records as a percentage of the plurality of records to provide final first-position records; and
   include the initial first-position records which are not in the final first-position records as second-level records.

8. The computer-implemented method of claim 1 wherein to group at least some of the second-level records into the plurality of groups comprises to group the at least some of the second-level records according to a product category.

9. The computer-implemented method of claim 1, wherein to provide information regarding the significant record comprises to:
   determine a top N products in the group; and
   provide a list of the top N products for display.

10. The computer-implemented method of claim 1 wherein the database comprises over a million records.

11. A computer-implemented method to identify significant records in a database, the computer-implemented method comprising executing instructions in a computer system to:
    group records of a plurality of records in a database into a plurality of groups based upon a latent factor clustering algorithm, wherein the records in the database correspond to products in a catalog;
    order the records in a group according to a first factor to provide ordered records;
    for at least some of the groups of the plurality of groups, identify ordered records in a group which have a first position to provide first-level records and records in the database which have a second position less to provide second-level records, the first position being greater than a first threshold, the second position being less than the first threshold, such that first-level records do not include the second-level records;
    group at least some of the second-level records into a plurality of groups, the groups being based on a second factor, such that the plurality of groups do not include the first-level records;
    for at least some groups, order the second-level records in the at least some groups in accordance with one or more of a third factor and the first factor;
    for each group of the at least some groups, identify records in the group which have a third position, the third position being greater than a second threshold for the group; and
    provide information regarding at least one of the first-level records or at least one of the records in the group which have the second position as at least one significant record by presenting information related to a particular product in the catalog corresponding to the at least one significant record to a user through a graphical user interface of an electronic marketplace web site.

12. The computer-implemented method of claim 11:
further comprising: to select a group of the plurality of groups based upon a first factor to provide a selected group;
wherein to provide information regarding at least one of the first-level records comprises: to provide information regarding at least one of the first-level records in the selected group.

13. The computer-implemented method of claim 11 wherein:
the first factor is popularity of the products based on a respective number of page views of the products.

14. The computer-implemented method of claim 11 wherein:
the first factor is popularity of the products based upon a purchase volume of the products.

15. The computer-implemented method of claim 11 wherein:
the first factor is popularity of the products based upon a purchase velocity of the products.

16. The computer-implemented method of claim 11 wherein to identify ordered records in a group which have the first position to provide first-level records comprises to:
identify records in the group which have the first position to provide initial records;
identify the first N initial records to provide identified records; and
provide the identified records as the first-level records.

17. The computer-implemented method of claim 11 wherein to identify ordered records in a group which have the first position to provide first-level records comprises to:
identify records in the group which have the first position to provide initial records;
identify the first N percent of the initial records to provide identified records; and
provide the identified records as the first-level records.

18. The computer-implemented method of claim 11 wherein there are a plurality of product categories, each product being associated with at least on category, and wherein to provide information regarding at least one of the first-level records comprises to provide information regarding products in different categories.

19. The computer-implemented method of claim 11 wherein to provide information regarding at least one of the first-level records comprises to:
selecting the at least one of the first-level records based upon a product being browsed, a category being browsed, a browsing history of a customer, an identified preference of a customer, to provide a selected first-level record; and
providing the selected first-level record as the at least one of the first-level records.

20. The computer-implemented method of claim 11 wherein the database comprises over a million records.

* * * * *